(12) United States Patent
Alary et al.

(10) Patent No.: US 7,654,323 B2
(45) Date of Patent: Feb. 2, 2010

(54) ELECTROFUSED PROPPANT, METHOD OF MANUFACTURE, AND METHOD OF USE

(75) Inventors: Jean Andre Alary, Lille sur la Sorgue (FR); Sebastian Sachse, Villach (AT); Thomas Parias, Croissy sur Seine (FR)

(73) Assignee: Imerys, Paris (FR)

( * ) Notice: Subject to any disclaimer, the term of this patent is extended or adjusted under 35 U.S.C. 154(b) by 413 days.

(21) Appl. No.: 11/465,602

(22) Filed: Aug. 18, 2006

(65) Prior Publication Data

US 2007/0062699 A1    Mar. 22, 2007

(30) Foreign Application Priority Data

Sep. 21, 2005    (DE)    ........................ 10 2005 045 180

(51) Int. Cl.
*E21B 43/267* (2006.01)
(52) U.S. Cl. ................. 166/280.2; 423/592.1; 507/269; 51/319
(58) Field of Classification Search ............. 166/280.2; 507/269; 423/592.1; 51/319
See application file for complete search history.

(56) References Cited

U.S. PATENT DOCUMENTS

| | | | |
|---|---|---|---|
| 1,192,709 A * | 7/1916 | Tone ........................... | 423/625 |
| 1,871,792 A | 8/1932 | Horsfield | |
| 1,871,793 A | 8/1932 | Horsfield | |
| 1,942,431 A | 1/1934 | Jung | |
| 2,261,639 A | 11/1941 | Benner et al. | |
| 2,340,194 A | 1/1944 | McMullen | |
| 2,566,117 A | 8/1951 | Christie, Jr. et al. | |
| 2,699,212 A | 1/1955 | Dismukes | |
| 2,950,247 A | 8/1960 | McGuire, Jr. et al. | |
| 2,986,455 A | 5/1961 | Sandmeyer | |
| 3,026,938 A | 3/1962 | Huitt et al. | |
| 3,075,581 A | 1/1963 | Kern | |
| 3,079,243 A | 2/1963 | Ueltz | |
| 3,126,056 A | 3/1964 | Harrell | |
| 3,241,613 A | 3/1966 | Kern et al. | |
| 3,242,032 A | 3/1966 | Schott | |
| 3,245,866 A | 4/1966 | Schott | |
| 3,347,798 A | 10/1967 | Baer et al. | |
| 3,350,482 A | 10/1967 | Bowers | |
| 3,399,727 A | 9/1968 | Graham et al. | |
| 3,437,148 A | 4/1969 | Colpoys, Jr. | |
| 3,486,706 A | 12/1969 | Weyand | |
| 3,491,492 A | 1/1970 | Ueltz | |
| 3,497,008 A | 2/1970 | Graham et al. | |
| 3,598,373 A | 8/1971 | Inman | |
| 3,690,622 A | 9/1972 | Brunner et al. | |
| 3,758,318 A | 9/1973 | Farris et al. | |
| 3,763,603 A * | 10/1973 | Trischuk ...................... | 451/38 |
| 3,810,768 A | 5/1974 | Parsons et al. | |
| 3,856,441 A | 12/1974 | Suzukawa et al. | |
| 3,890,072 A | 6/1975 | Barks | |
| 3,976,138 A | 8/1976 | Colpoys, Jr. et al. | |
| 4,008,763 A | 2/1977 | Lowe, Jr. | |
| 4,051,603 A | 10/1977 | Kern, Jr. | |
| 4,052,794 A | 10/1977 | Ganiaris | |
| 4,053,375 A | 10/1977 | Roberts et al. | |
| 4,068,718 A | 1/1978 | Cooke, Jr. et al. | |
| 4,072,193 A | 2/1978 | Sarda et al. | |
| 4,077,908 A | 3/1978 | Stenzel et al. | |
| 4,104,342 A | 8/1978 | Wessel et al. | |
| 4,111,713 A | 9/1978 | Beck | |
| 4,140,773 A | 2/1979 | Stowell et al. | |
| 4,252,544 A | 2/1981 | Takahashi | |
| 4,268,311 A | 5/1981 | VerDow | |
| 4,296,051 A | 10/1981 | Shimamura et al. | |
| 4,303,204 A | 12/1981 | Weston | |
| 4,343,751 A | 8/1982 | Kumar | |
| 4,371,481 A | 2/1983 | Pollock | |
| 4,392,988 A | 7/1983 | Dobson et al. | |
| 4,396,595 A | 8/1983 | Heytmeijer et al. | |
| 4,407,967 A | 10/1983 | Luks | |
| 4,427,068 A | 1/1984 | Fitzgibbon | |

(Continued)

FOREIGN PATENT DOCUMENTS

| | | |
|---|---|---|
| AU | 551409 | 1/1983 |
| BR | 9501449 C1 | 8/1997 |
| BR | 9501450 A | 8/1997 |
| BR | 303442 A | 5/2005 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |

(Continued)

OTHER PUBLICATIONS

Bauxite—Mineral Properties and Uses, www.geology.com, Copyright 2005-2009.*
Aluminum Oxide, Digitalfire Ceramic Materials Database, Copyright 2003, 2008.*

(Continued)

*Primary Examiner*—Timothy J. Kugel
*Assistant Examiner*—Atnaf Admasu
(74) *Attorney, Agent, or Firm*—Finnegan, Henderson, Farabow, Garrett & Dunner, L.L.P.

(57) ABSTRACT

An embodiment consistent with the present invention is a high strength proppant comprising an electrofused pellet. In another embodiment, a high strength proppant comprises a substantially solid and substantially spherical pellet produced by electrofusion of at least one metal oxide. A method of making a proppant is also provided, with that method comprising melting at least one metal oxide in an electrical arc furnace, pouring the molten metal oxide to create a pour stream, and separating the pour stream to form at least one electrofused pellet. A method of fracturing subterranean formations is also provided, with that method comprising injecting a fluid containing at least one electrofused pellet.

125 Claims, 3 Drawing Sheets

U.S. PATENT DOCUMENTS

| | | | |
|---|---|---|---|
| 4,439,489 A | 3/1984 | Johnson et al. |
| 4,440,866 A | 4/1984 | Lunghofer et al. |
| 4,442,897 A | 4/1984 | Crowell |
| 4,450,184 A | 5/1984 | Longo et al. |
| 4,462,466 A | 7/1984 | Kachnik |
| 4,493,875 A | 1/1985 | Beck et al. |
| 4,509,598 A | 4/1985 | Earl et al. |
| 4,521,475 A | 6/1985 | Riccio et al. |
| 4,522,731 A | 6/1985 | Lunghofer |
| 4,547,468 A | 10/1985 | Jones et al. |
| 4,555,493 A | 11/1985 | Watson et al. |
| 4,607,697 A | 8/1986 | Urffer |
| 4,618,504 A | 10/1986 | Bosna et al. |
| 4,623,630 A | 11/1986 | Fitzgibbon |
| 4,628,042 A | 12/1986 | Speronello |
| 4,632,876 A | 12/1986 | Laird et al. |
| 4,639,427 A | 1/1987 | Khaund |
| 4,652,411 A | 3/1987 | Swarr et al. |
| 4,654,266 A | 3/1987 | Kachnik |
| 4,657,754 A | 4/1987 | Bauer et al. |
| 4,658,899 A | 4/1987 | Fitzgibbon |
| 4,668,645 A | 5/1987 | Khaund |
| 4,671,909 A | 6/1987 | Torobin |
| 4,680,230 A | 7/1987 | Gibb et al. |
| 4,713,203 A | 12/1987 | Andrews |
| 4,714,623 A | 12/1987 | Riccio et al. |
| 4,744,831 A | 5/1988 | Beck |
| 4,867,931 A | 9/1989 | Cochran, Jr. |
| 4,869,960 A | 9/1989 | Gibb et al. |
| 4,874,726 A | 10/1989 | Kleeb et al. |
| 4,879,181 A | 11/1989 | Fitzgibbon |
| 4,892,147 A | 1/1990 | Jennings, Jr. et al. |
| 4,894,285 A | 1/1990 | Fitzgibbob |
| 4,911,987 A | 3/1990 | Sakata et al. |
| 4,921,820 A | 5/1990 | Rumpf et al. |
| 4,921,821 A | 5/1990 | Rumpf et al. |
| 4,923,714 A | 5/1990 | Gibb et al. |
| 4,944,905 A | 7/1990 | Gibb et al. |
| 4,977,116 A | 12/1990 | Rumpf et al. |
| 5,002,904 A | 3/1991 | Jain et al. |
| 5,030,603 A | 7/1991 | Rumpf et al. |
| 5,045,506 A | 9/1991 | Dube et al. |
| 5,120,455 A | 6/1992 | Lunghofer |
| 5,175,133 A | 12/1992 | Smith et al. |
| 5,182,051 A | 1/1993 | Bandy et al. |
| 5,188,175 A | 2/1993 | Sweet |
| 5,212,143 A | 5/1993 | Torobin |
| 5,225,123 A | 7/1993 | Torobin |
| 5,240,654 A | 8/1993 | Smith et al. |
| RE34,371 E | 9/1993 | Rumpf et al. |
| 5,243,190 A | 9/1993 | Bandy et al. |
| 5,304,226 A | 4/1994 | Hasegawa et al. |
| 5,330,005 A | 7/1994 | Card et al. |
| 5,358,047 A | 10/1994 | Himes et al. |
| 5,387,268 A | 2/1995 | Hiraiwa et al. |
| 5,396,805 A | 3/1995 | Surjaatmadja |
| 5,397,759 A | 3/1995 | Torobin |
| 5,420,174 A | 5/1995 | Dewprashad |
| 5,422,183 A | 6/1995 | Sinclair et al. |
| 5,439,055 A | 8/1995 | Card et al. |
| 5,501,274 A | 3/1996 | Nguyen et al. |
| 5,501,275 A | 3/1996 | Card et al. |
| 5,547,023 A | 8/1996 | McDaniel et al. |
| 5,582,249 A | 12/1996 | Caveny et al. |
| 5,582,250 A | 12/1996 | Constien |
| 5,597,784 A | 1/1997 | Sinclair et al. |
| 5,604,184 A | 2/1997 | Ellis et al. |
| 5,633,084 A | 5/1997 | Hiraiwa et al. |
| 5,697,440 A | 12/1997 | Weaver et al. |
| 5,699,860 A | 12/1997 | Grundmann |
| 5,775,425 A | 7/1998 | Weaver et al. |
| 5,782,300 A | 7/1998 | James et al. |
| 5,787,986 A | 8/1998 | Weaver et al. |
| 5,833,000 A | 11/1998 | Weaver et al. |
| 5,837,656 A | 11/1998 | Sinclair et al. |
| 5,839,510 A | 11/1998 | Weaver et al. |
| 5,853,048 A | 12/1998 | Weaver et al. |
| 5,871,049 A | 2/1999 | Weaver et al. |
| 5,948,734 A | 9/1999 | Sinclair et al. |
| 5,955,144 A | 9/1999 | Sinclair et al. |
| 5,964,291 A | 10/1999 | Bourne et al. |
| 5,972,835 A | 10/1999 | Gupta |
| RE36,466 E | 12/1999 | Nelson et al. |
| 6,015,442 A | 1/2000 | Alary |
| 6,032,741 A | 3/2000 | Johnson |
| 6,047,772 A | 4/2000 | Weaver et al. |
| 6,059,034 A | 5/2000 | Rickards et al. |
| 6,074,754 A | 6/2000 | Jacobsen et al. |
| 6,080,232 A | 6/2000 | Sperlich et al. |
| 6,152,227 A | 11/2000 | Lawson et al. |
| 6,172,011 B1 | 1/2001 | Card et al. |
| 6,192,985 B1 | 2/2001 | Hinkel et al. |
| 6,209,643 B1 | 4/2001 | Nguyen et al. |
| 6,217,646 B1 | 4/2001 | Gervais |
| 6,330,916 B1 | 12/2001 | Rickards et al. |
| 6,364,018 B1 | 4/2002 | Brannon et al. |
| 6,372,678 B1 | 4/2002 | Youngman et al. |
| 6,406,789 B1 | 6/2002 | McDaniel et al. |
| 6,419,019 B1 | 7/2002 | Palmer et al. |
| 6,503,676 B2 | 1/2003 | Yamashita et al. |
| 6,528,157 B1 | 3/2003 | Hussain et al. |
| 6,582,819 B2 | 6/2003 | McDaniel et al. |
| 6,599,863 B1 | 7/2003 | Palmer et al. |
| 6,632,527 B1 | 10/2003 | McDaniel et al. |
| 6,659,179 B2 | 12/2003 | Nguyen |
| 6,668,926 B2 | 12/2003 | Nguyen et al. |
| 6,725,926 B2 | 4/2004 | Nguyen et al. |
| 6,725,930 B2 | 4/2004 | Boney et al. |
| 6,725,931 B2 | 4/2004 | Nguyen et al. |
| 6,729,404 B2 | 5/2004 | Nguyen et al. |
| 6,732,800 B2 | 5/2004 | Acock et al. |
| 6,743,269 B2 | 6/2004 | Meyer et al. |
| 6,749,025 B1 | 6/2004 | Brannon et al. |
| 6,752,208 B1 | 6/2004 | Nguyen |
| 6,753,299 B2 | 6/2004 | Lunghofer et al. |
| 6,772,838 B2 | 8/2004 | Dawson et al. |
| 6,780,804 B2 | 8/2004 | Webber et al. |
| 6,830,105 B2 | 12/2004 | Thesing |
| 6,832,652 B1 | 12/2004 | Dillenbeck et al. |
| 6,837,309 B2 | 1/2005 | Boney et al. |
| 6,866,099 B2 | 3/2005 | Nguyen |
| 6,887,811 B2 | 5/2005 | Kanbara et al. |
| 6,892,813 B2 | 5/2005 | Nguyen et al. |
| 6,949,491 B2 | 9/2005 | Cooke, Jr. |
| 6,962,200 B2 | 11/2005 | Nguyen et al. |
| 6,983,797 B2 | 1/2006 | Nguyen et al. |
| 7,004,255 B2 | 2/2006 | Boney |
| 7,032,664 B2 | 4/2006 | Lord et al. |
| 7,032,667 B2 | 4/2006 | Nguyen et al. |
| 7,036,591 B2 | 5/2006 | Cannan et al. |
| 7,036,592 B2 | 5/2006 | Nguyen et al. |
| 7,040,403 B2 | 5/2006 | Nguyen et al. |
| 7,044,220 B2 | 5/2006 | Nguyen et al. |
| 7,044,224 B2 | 5/2006 | Nguyen |
| 7,053,018 B2 | 5/2006 | Kanbara et al. |
| 7,063,150 B2 | 6/2006 | Slabaugh et al. |
| 7,066,258 B2 | 6/2006 | Justus et al. |
| 7,067,445 B2 | 6/2006 | Webber et al. |
| 7,080,688 B2 | 7/2006 | Todd et al. |
| 7,081,439 B2 | 7/2006 | Sullivan et al. |
| 7,082,993 B2 | 8/2006 | Ayoub et al. |
| 7,086,460 B2 | 8/2006 | Nguyen et al. |
| 7,119,039 B2 | 10/2006 | Krause et al. |
| 7,128,158 B2 | 10/2006 | Nguyen et al. |

| | | | | | |
|---|---|---|---|---|---|
| 7,160,844 | B2 | 1/2007 | Urbanek | | |
| 2003/0029094 | A1 | 2/2003 | Moeltgen et al. | | |
| 2003/0195121 | A1 | 10/2003 | Fitzgerald | | |
| 2004/0040708 | A1 | 3/2004 | Stephenson et al. | | |
| 2004/0093804 | A1 | 5/2004 | Alary | | |
| 2004/0129923 | A1 | 7/2004 | Nguyen et al. | | |
| 2004/0162224 | A1 | 8/2004 | Nguyen et al. | | |
| 2004/0200617 | A1 | 10/2004 | Stephenson et al. | | |
| 2004/0224155 | A1 | 11/2004 | Barron et al. | | |
| 2005/0019574 | A1 | 1/2005 | McCrary | | |
| 2005/0028979 | A1 | 2/2005 | Brannon et al. | | |
| 2005/0059555 | A1 | 3/2005 | Dusterhoft et al. | | |
| 2005/0059558 | A1 | 3/2005 | Blauch et al. | | |
| 2005/0096207 | A1 | 5/2005 | Urbanek | | |
| 2005/0126780 | A1 | 6/2005 | Todd et al. | | |
| 2005/0130848 | A1 | 6/2005 | Todd et al. | | |
| 2005/0145385 | A1 | 7/2005 | Nguyen | | |
| 2005/0166803 | A1 | 8/2005 | Dillenbeck et al. | | |
| 2005/0173116 | A1 | 8/2005 | Nguyen et al. | | |
| 2005/0194141 | A1 | 9/2005 | Sinclair et al. | | |
| 2005/0244641 | A1 | 11/2005 | Vincent | | |
| 2005/0274523 | A1 | 12/2005 | Brannon et al. | | |
| 2005/0284630 | A1 | 12/2005 | Nguyen et al. | | |
| 2005/0284631 | A1 | 12/2005 | Nguyen et al. | | |
| 2006/0006589 | A1 | 1/2006 | Canova et al. | | |
| 2006/0016598 | A1 | 1/2006 | Urbanek | | |
| 2006/0035790 | A1 | 2/2006 | Okell et al. | | |
| 2006/0048944 | A1 | 3/2006 | van Batenburg et al. | | |
| 2006/0054324 | A1 | 3/2006 | Sullivan et al. | | |
| 2006/0058173 | A1 | 3/2006 | Mozhzherin et al. | | |
| 2006/0065398 | A1 | 3/2006 | Brannon et al. | | |
| 2006/0073980 | A1 | 4/2006 | Brannon et al. | | |
| 2006/0078682 | A1 | 4/2006 | McDaniel et al. | | |
| 2006/0081371 | A1 | 4/2006 | Duenckel et al. | | |
| 2006/0113078 | A1 | 6/2006 | Nguyen et al. | | |
| 2006/0113080 | A1 | 6/2006 | Nguyen et al. | | |
| 2006/0124303 | A1 | 6/2006 | Nguyen et al. | | |
| 2006/0151170 | A1 | 7/2006 | Brannon et al. | | |
| 2006/0157244 | A1 | 7/2006 | Reddy et al. | | |
| 2006/0162926 | A1 | 7/2006 | Roddy | | |
| 2006/0162929 | A1 | 7/2006 | Urbanek | | |
| 2006/0166834 | A1 | 7/2006 | Roddy | | |
| 2006/0174802 | A1 | 8/2006 | Bedel et al. | | |
| 2006/0175058 | A1 | 8/2006 | Nguyen | | |
| 2006/0201673 | A1 | 9/2006 | Welton et al. | | |
| 2006/0219600 | A1 | 10/2006 | Palamara et al. | | |
| 2006/0243441 | A1 | 11/2006 | Cornelius de Grood et al. | | |
| 2006/0258546 | A1 | 11/2006 | Brannon et al. | | |
| 2006/0272816 | A1 | 12/2006 | Willberg et al. | | |
| 2007/0023187 | A1 | 2/2007 | Canova et al. | | |

FOREIGN PATENT DOCUMENTS

| | | |
|---|---|---|
| DE | 1281306 | 10/1968 |
| DE | 2948584 | 6/1980 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| EP | 1157077 | 8/2002 |
| EP | 1355038 | 10/2003 |
| GB | 284131 | 1/1928 |
| GB | 578424 | 6/1946 |
| GB | 715354 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| PH | 18450 | 7/1985 |
| RU | 2129987 | 5/1999 |
| RU | 2140478 | 11/1999 |
| RU | 2140875 | 11/1999 |
| RU | 99107936 | 1/2001 |
| RU | 2166079 | 4/2001 |
| RU | 2196889 | 1/2003 |
| RU | 2211198 | 8/2003 |
| RU | 2215712 | 11/2003 |
| RU | 2003100030/03 | 11/2003 |
| RU | 2002117351 | 1/2004 |
| WO | WO 92/09543 | 6/1992 |
| WO | WO 0064573 | 11/2000 |
| WO | WO 0130699 | 5/2001 |
| WO | WO 2004/097171 | 1/2004 |
| WO | WO 2004/046495 A2 | 6/2004 |
| WO | WO 2004/083600 | 9/2004 |
| WO | WO 2005/087665 | 9/2005 |
| WO | WO2005087665 A1 | 9/2005 |
| WO | WO 2005/100746 | 10/2005 |
| WO | WO2005100746 | 10/2005 |
| WO | WO2005110942 | 11/2005 |
| WO | WO 2006/082359 A1 | 8/2006 |
| WO | WO 2006/082416 A1 | 8/2006 |
| WO | WO 2006/084236 A1 | 8/2006 |
| WO | WO2006135997 A1 | 12/2006 |

OTHER PUBLICATIONS

Rickards, Allan R. et al. BJ Services, Members of Society of Petroleum Engineers; *High Strength, Ultra-Lightweight Proppant Lends New Dimensions to Hydraulic Fracturing Application*, SPE 84308, pp. 1-14; 2003.

Chambers, R. et al., *Comparison of Fracture Geometries Utilizing Ultralightweight Proppants Provide Evidence That Partial Monolayers Can Be Created: A Case History*, SPE 96818; pp. 1-9; 2005.

Mendez, A. et al.; *A Quantum Leap in Horizontal Gravel Pack Technology*; SPE 94945; pp. 1-7; 2005.

Kendrick, D.E. et al., *Ultralightweight Proppants: A Field Study in the Big Sandy Field of Eastern Kentucky*; SPE 98006; pp. 1-7; 2005.

Rickards, Allan R. et al.; *High Strength, Ultra-Lightweight Proppant Lends New Dimensions to Hydraulic Fracturing Applications*; SPE 84308; pp. 1-14; 2003.

Letter dated Aug. 4, 1978 to B. Poplin from D. Golden, Coors Porcelain Company, with "Proposal to Supply Proppant," presented to Halliburton Services, issued Aug. 9, 1978.

Cutler, R.A. et al., TerraTek, Inc.; *Light Weight Proppants for Deep Gas Well Stimulation*, 2nd Annual Report, Jul. 1, 1980-Jun. 30, 1981, published Apr. 1982, DOE Contract AC19-79BC10038.

Jones, A. H. et al., TerraTek, Inc.; *Light Weight Proppants for Deep Gas Well Stimulation*, Jun. 1980, TR Report 80-47; DOE Contract AC19-79BC10038.

Neel, E.A. et al.; *Oxide Ceramic Proppants for Treatment of Deep Well Fractures*, SPE 6816, (1977).

UCAR Ceramic Props, *The Ideal Proppant for Deep Wells and High Compaction Pressures*.

DOE Progress Review No. 26 for reporting period Jan. 1-Mar. 31, 1981, Determine Feasibility of Fabricated Light Weight Proppants for Application in Gas and Oil Well Stimulation.

*Unimin Brochure*, Unimin Canada Ltd., Mar. 1991.

Johnson, S. M. et al., *Role of Impurities on Formation of Mulite from Kaolinite and $Al_2O_3SiO_2$ Mixtures*, Ceramic Bulletin, Vo. 61 No. 8 (1982), pp. 838-842.

*Determining Feasibility of Fabricating Light Weight Proppants for Application in Gas and Oil Well Stimulation*, Progress Report 2, DOE Contract DE-AC19-79BC10038, Submitted by Terra Tek, Inc., TR 79-77, Oct. 1979.

*Determining Feasibility of Fabricating Light Weight Proppants for Application in Gas and Oil Well Stimulation*, Progress Report 10, EOE Contract DE-AC19-79BC10038, Submitted by Terra Tek, Inc., TR 80-77, Jul. 1980.

Cutler, Raymond A., et al.; *New Proppants for Deep Gas Well Stimulation*, SPE 9869, 1977.

Sane, S.C. et al., *Effect of Grinding and Firing Treatment on the Crystalline and Glass Content and the Physical Properties of Whiteware Bodies*; 1951.

Lynch, E.D. et al., *Nepheline Syenite-Talc Mixtures as a Flux in Low-Temperature Vitrified Bodies*; 1950.

Lynch, J.F. et al., *Databook to Guide Materials Selection for Structural Applications*, Engineering Properties of Ceramics, TR 66-52, Jun. 1966.

West, Richard R. et al.; *Reactions in Silica-Alumina Mixtures*, Apr. 1958.

Mazdiyasni, K.S. et al.; *Synthesis and Mechanical Properties of Stoichiometric Aluminum Silicate (Mullite)*, Dec. 1972.

Cooke, Claude E., Society of Petroleum Engineers of AIME; *Hydraulic Fracturing with a high-Strength Proppant*, SPE 6213, 1976.

McDaniel, Robert R. et al., *The Effect of Various Proppants and Proppant Mixtures on Fracture Permeability*, SPE 7573, 1978.

Knibbs, D. Sc., N.V.S; *The Industrial Uses of Bauxite*, 1928.

DOE Progress Review No. 21 for reporting period Oct. 1-Dec. 31, 1979, *Determining Feasibility of Fabricating Light Weight Proppants for Application in Gas and Oil Well Stimulation*.

DOE Progress Review No. 22 for reporting period Jan. 1-Mar. 31, 1980, *Determining Feasibility of Fabricating Light Weight Proppants for Application in Gas and Oil Well Stimulation*.

DOE Progress Review No. 23 for reporting period Apr. 1-Jun. 30, 1980, *Determining Feasibility of Fabricating Light Weight Proppants for application in Gas and Oil Well Stimulation*.

DOE Progress Review No. 24 for reporting period Jul. 1-Sep. 31, 1980, *Determining Feasibility of Fabricating Light Weight Proppants for Application in Gas and Oil Well Stimulation*.

DOE Progress Review No. 27 for reporting period Apr. 1-Jun. 30, 10981, *Determining Feasibility of Fabricating Light Weight Proppants for Application in Gas and Oil Well Stimulation*.

Document entitled Feb. Mar. Apr. 1998: *Commercial Activity*, with Exhibits A-D.

Document entitled Jul. 1998: *Commercial Activity*, with Exhibit E.

Document entitled Sep. 2001: *Commercial Activity*, with Exhibit F.

*ScalePROP* brochure, Schlumberger, Jan. 2002.

International Search Report for Application No. PCT/IB2007/004331 dated Jul. 22, 2008.

Armstrong, Kevin; Collins, Jim; Dumont, Gilbert; Slusher, Gary; *Advanced Fracturing Fluids Improve Well Economics; Oilfield Review*; Autumn 1995; pp. 34-51.

Olson, K; Haidar S.; Milton-Tayler, D.; Olsen E.; *Multiphase Non-Darcy Pressure Drop in Hydraulic Fracturing; Society of Petroleum Engineers*; SPE 90406; 27 pages.

* cited by examiner

SIEVE OPENING

| U.S. MESH | (IN) | (MM) |
|---|---|---|
| 2.5 | 0.3150 | 8.0000 |
| 3 | 0.2650 | 6.7300 |
| 3.5 | 0.2230 | 5.6600 |
| 4 | 0.1870 | 4.7600 |
| 5 | 0.1570 | 4.0000 |
| 6 | 0.1320 | 3.3600 |
| 7 | 0.1110 | 2.8300 |
| 8 | 0.0937 | 2.3800 |
| 10 | 0.0787 | 2.0000 |
| 12 | 0.0661 | 1.6800 |
| 14 | 0.0555 | 1.4100 |
| 16 | 0.0469 | 1.1900 |
| 18 | 0.0394 | 1.0000 |
| 20 | 0.0331 | 0.8400 |
| 25 | 0.0280 | 0.7100 |
| 30 | 0.0232 | 0.5890 |
| 35 | 0.0197 | 0.5000 |
| 40 | 0.0165 | 0.4200 |
| 45 | 0.0138 | 0.3510 |
| 50 | 0.0117 | 0.2970 |
| 60 | 0.0098 | 0.2500 |
| 70 | 0.0083 | 0.2100 |
| 80 | 0.0070 | 0.1770 |
| 100 | 0.0059 | 0.1490 |
| 120 | 0.0049 | 0.1240 |
| 140 | 0.0041 | 0.1040 |
| 170 | 0.0035 | 0.0880 |
| 200 | 0.0029 | 0.0740 |
| 230 | 0.0024 | 0.0620 |
| 270 | 0.0021 | 0.0530 |
| 325 | 0.0017 | 0.0440 |
| 400 | 0.0015 | 0.0370 |

*FIG. 2*

SINTERED SPHERES

ELECTROFUSED SPHERES

ELECTROFUSED PROPPANT, METHOD OF MANUFACTURE, AND METHOD OF USE

FIELD OF THE INVENTION

The present invention relates to a proppant for fractured earth having a high compressive strength and a good conductivity.

BACKGROUND

Naturally occurring deposits containing oil and natural gas have been located throughout the world. Given the porous and permeable nature of the subterranean structure, it is possible to bore into the earth and set up a well where oil and natural gas are pumped out of the deposit. These wells are large, costly structures that are typically fixed at one location. As is often the case, a well may initially be very productive, with the oil and natural gas being pumpable with relative ease. As the oil or natural gas near the well bore is removed from the deposit, other oil and natural gas may flow to the area near the well bore so that it may be pumped as well. However, as a well ages, and sometimes merely as a consequence of the subterranean geology surrounding the well bore, the more remote oil and natural gas may have difficulty flowing to the well bore, thereby reducing the productivity of the well.

To address this problem and to increase the flow of oil and natural gas to the well bore, companies have employed the well-known technique of fracturing the subterranean area around the well to create more paths for the oil and natural gas to flow toward the well. As described in more detail in the literature, this fracturing is accomplished by hydraulically injecting a fluid at very high pressure into the area surrounding the well bore. This fluid must then be removed from the fracture to the extent possible to ensure that it does not impede the flow of oil or natural gas back to the well bore. Once the fluid is removed, the fractures have a tendency to collapse due to the high compaction pressures experienced at well-depths, which can be more than 20,000 feet. To prevent the fractures from closing, it is well-known to include a propping agent, also known as a proppant, in the fracturing fluid. The goal is to be able to remove as much of the injection fluid as possible while leaving the proppant behind to keep the fractures open.

Several properties affect the performance of a proppant. If forces in a fracture are too high for a given proppant, the proppant will crush and collapse, and then no longer have a sufficient permeability to allow the proper flow of oil or natural gas. In deep wells or wells whose formation forces are high, proppants must be capable of withstanding high compressive forces, often greater than 10,000 pounds per square inch ("psi"). Proppants able to withstand these forces (e.g., up to and greater than 10,000 psi) are referred to as high strength proppants. In shallower wells, high strength proppants may not be necessary as intermediate strength proppants may suffice. Intermediate strength proppants are typically used where the compressive forces are between 5,000 and 10,000 psi. Still other proppants can be used when the compressive forces are low. For example, sand is often used as a proppant at low compressive forces.

In addition to the strength of the proppant, how the proppant will pack with other proppant particles and the surrounding geological features is critical, as the nature of the packing can impact the flow of the oil and natural gas through the fractures. For example, if the proppant particles become too tightly packed, they may actually inhibit the flow of the oil or natural gas rather than increase it.

The nature of the packing also has an effect on the overall turbulence generated through the fractures. Too much turbulence can increase the flowback of the proppant particles from the fractures toward the well bore. This may undesirably decrease the flow of oil and natural gas, contaminate the well, cause abrasion to the equipment in the well, and increase the production cost as the proppants that flow back toward the well must be removed from the oil and gas.

The useful life of the well may also be shortened if the proppant particles break down. For this reason, proppants have conventionally been designed to minimize breaking. For example, U.S. Pat. No. 3,497,008 to Graham et al. discloses a preferred proppant composition of a hard glass that has decreased surface flaws to prevent failure at those flaws. It also discloses that the hard glass should have a good resistance to impact abrasion, which serves to prevent surface flaws from occurring in the first place. These features have conventionally been deemed necessary to avoid breaking, which creates undesirable fines within the fracture.

The shape of the proppant has a significant impact on how it packs with other proppant particles and the surrounding area. Thus, the shape of the proppant can significantly alter the permeability and conductivity of a proppant pack in a fracture. Different shapes of the same material offer different strengths and resistance to closure stress. It is desirable to engineer the shape of the proppant to provide high strength and a packing tendency that will increase the flow of oil or natural gas. The optimum shape may differ for different depths, closure stresses, geologies of the surrounding earth, and materials to be extracted.

The conventional wisdom in the industry is that spherical pellets of relatively uniform size are the most effective proppant body shape to maximize the permeability of the fracture. See, e.g., U.S. Pat. No. 6,753,299 to Lunghofer et al. Indeed, the American Petroleum Institute's ("API's") description of the proppant qualification process has a section dedicated to the evaluation of roundness and sphericity as measured on the Krumbein scale. The more spherical the proppant, the better it is believed to perform in the proppant pack.

Another property that impacts a proppant's utility is how quickly it settles both in the injection fluid and once it is in the fracture. A proppant that quickly settles may not reach the desired propping location in the fracture, resulting in a low level of proppants in the desired fracture locations, such as high or deep enough in the fracture to maximize the presence of the proppant in the pay zone (i.e., the zone in which oil or natural gas flows back to the well). This can cause reduced efficacy of the fracturing operation. Ideally, a proppant disperses equally throughout all portions of the fracture. Gravity works against this ideal, pulling particles toward the bottom of the fracture. However, proppants with properly engineered densities and shapes may be slow to settle, thereby increasing the functional propped area of the fracture. How quickly a proppant settles is determined in large part by its specific gravity. Engineering the specific gravity of the proppant for various applications is desirable because an optimized specific gravity allows for a proppant to be better placed within the fracture.

Yet another attribute to consider in designing a proppant is its acid-tolerance, as acids are often used in oil and natural gas wells and may undesirably alter the properties of the proppant. For example, hydrofluoric acid is commonly used to treat oil wells, making a proppant's resistance to that acid of high importance.

Still another property to consider for a proppant is its surface texture. A surface texture that enhances, or at least does not inhibit, the conductivity of the oil or gas through the fracture is desirable. Smoother surfaces offer certain advantages over rough surfaces, such as reduced tool wear and a better conductivity, but porous surfaces may still be desirable for some applications where a reduced density may be useful.

All of these properties, some of which can at times conflict with each other, must be weighed in determining the right proppant for a particular situation. Because stimulation of a well through fracturing is by far the most expensive operation over the life of the well, one must also consider the economics. Proppants are typically used in large quantities, making them a large part of the cost.

Attempts have been made to optimize proppants and methods of using them. Suggested materials for proppants include sand, glass beads, ceramic pellets, and portions of walnuts. The preferred material disclosed in previously-mentioned U.S. Pat. No. 3,497,008 is a hard glass, but it also mentions that sintered alumina, steatite, and mullite could be used. Alumina has conventionally been thought to add strength to a proppant, so many early proppants were made of high-alumina materials, such as bauxite. The strength of these high-alumina materials is believed to be due to the mechanical properties of dense ceramic materials therein. See, e.g., U.S. Pat. Nos. 4,068,718 and 4,427,068, both of which disclose proppants made with bauxite. Bauxite ceramics are known to optimize the toughness of a proppant whereas alumina ceramics optimize their hardness. For example, previously-mentioned U.S. Pat. No. 4,427,068 discloses a proppant comprising a clay containing silica that adds a glassy phase to the proppant, thereby weakening the proppant. Furthermore, the silica of that patent is "free" silica, meaning that it is amorphous and not engaged, for example, to the mullite phase. In general, high amounts of silica reduce the strength of the final proppant. In particular, it is believed that sintered proppants containing more than 2% silica by weight will have reduced strength over those with lower silica contents. Other so-called impurities are also believed to reduce the strength of the proppant.

Early high strength proppants were made using tabular alumina which was a relatively expensive component. For this reason, the industry shifted from using tabular alumina to other alumina sources, such as bauxite. By the late 1970's, the development focus in the industry shifted from high strength proppants to intermediate or lower strength, lower density proppants that were easier to transport and use, and were less expensive. Over the next 20 years, the industry focused on commercialization of lower density proppants and they became commonly used. The primary method of reducing the density of proppants is to replace at least a portion of the higher density alumina with lower density silica. According to U.S. Pat. No. 6,753,299, "the original bauxite based proppants of the early 1970's contained >80% alumina (Cooke). Subsequent generations of proppants contained an alumina content of >70% (Fitzgibbons), 40% to 60% (Lunghofer), and later 30% to <40% (Rumpf, Fitzgibbons)." Thus, as to both product development and proppant use, there was a retreat in the industry from proppants manufactured from high-alumina materials such as bauxite.

Numerous production methods have been suggested for making spherical alumina pellets. For example, U.S. Pat. No. 4,427,068 to Fitzgibbon discloses a method of making sintered pellets using a dry pelletizing process. In that process, which is described in more detail below, pellets are forced to rub against each other in a mixer to increase their sphericity. After mixing, the pellets are sintered in a known fashion. Another known method involves preparing an aqueous feed from the desired pellet materials and continuously atomizing the feed into a layer of already partly dried particles made from the same pellet material. Both of these known methods result in particles having surface irregularities and a less than ideal spherical shape. These properties contribute to an uneven distribution of stress that leads to crushing and the generation of fines. They also contribute to having lower void volumes in the pack, as well as a lower conductivity. The surface irregularities can also have an undesirable abrasive effect on the pumping equipment in the well, and have a higher coefficient of friction that can make the removal of the fracturing fluid from the well more difficult and costly. An alternative production process, electrofusion, has been suggested in U.S. Pat. No. 5,964,291 to Bourne et al. However, electrofusion is not the focus of that patent, and no details are provided regarding how the electrofusion is to be accomplished. Indeed, the applicants are not aware of any electrofused proppant products that have been on the market in the past or are on the market today.

Today, as resources become more scarce, the search for oil and gas involves penetration into deeper geological formations, and the recovery of the raw materials becomes increasingly difficult. Therefore, there is a need for proppants that have an excellent conductivity and permeability even under extreme conditions.

SUMMARY OF THE INVENTION

An embodiment consistent with the present invention is a high strength proppant comprising an electrofused pellet. In another embodiment, a high strength proppant comprises a substantially solid and substantially spherical pellet produced by electrofusion of at least one metal oxide. A method of making a proppant is also provided, with that method comprising melting at least one metal oxide in an electrical arc furnace, pouring the molten metal oxide to create a pour stream, and separating the pour stream to form at least one electrofused pellet. A method of fracturing subterranean formations is also provided, with that method comprising injecting a fluid containing at least one electrofused pellet.

DESCRIPTION OF THE FIGURES

FIG. 2 is a table containing U.S. standard sieve sizes.

DESCRIPTION OF THE INVENTION

Reference will now be made in detail to embodiments of the present invention. A high strength electrofused proppant is found to achieve superior crush resistance, conductivity, and other benefits when used in fracturing subterranean formations surrounding oil and/or gas wells under relatively high closing pressures.

A high strength proppant in accordance with one embodiment of the present invention may be a spherical particle prepared by an electrofusion process (hereinafter referred to as an "electrofused sphere" or "electrofused pellet"). To initiate the electrofusion process, an alumina-containing material such as, for example, so-called pure or technical alumina, bauxite, mullite, or a combination of these or any other suitable alumina-containing material may be melted in an electric arc furnace. An example of such a furnace is described below in connection with an exemplary electrofusion process. Because a high alumina content is known to improve the hardness and toughness of a proppant, the metal oxide mixture may be formulated to include at least about 50% alumina by weight. In some embodiments, such as where bauxite is used as an alumina source, it may be desirable to create a molten mixture comprising more than about 90% alumina by weight.

In some embodiments, such as those where the primary source material contains little or no $SiO_2$ (e.g., pure alumina, meaning alumina that has impurities fewer than about 2% by weight), it may be additionally desirable to introduce a small amount of $SiO_2$, for example, between about 0.1% and about 1% by weight, into the mixture. The addition of $SiO_2$ may be accomplished either prior to or during the melting stage of the process. The addition of a small amount of $SiO_2$ has the advantage of improving the viscosity and flowability of the molten mixture, which contributes to achieving a more spherical product than electrofused pellets prepared without $SiO_2$, thereby providing improved crush resistance. A mixture with improved flowability also offers a wider range of speeds with which the mixture can be poured, allowing more control over the resultant particle size distribution. However, those skilled in the art will recognize that adding too much $SiO_2$ to the mixture can weaken the electrofused spheres, so care must be taken to balance the needs of improved flowability with the final properties of the electrofused product. Consequently, in some embodiments the $SiO_2$ content of the mixture may be limited to between about 0.3% and about 0.6% by weight.

Figure 1:
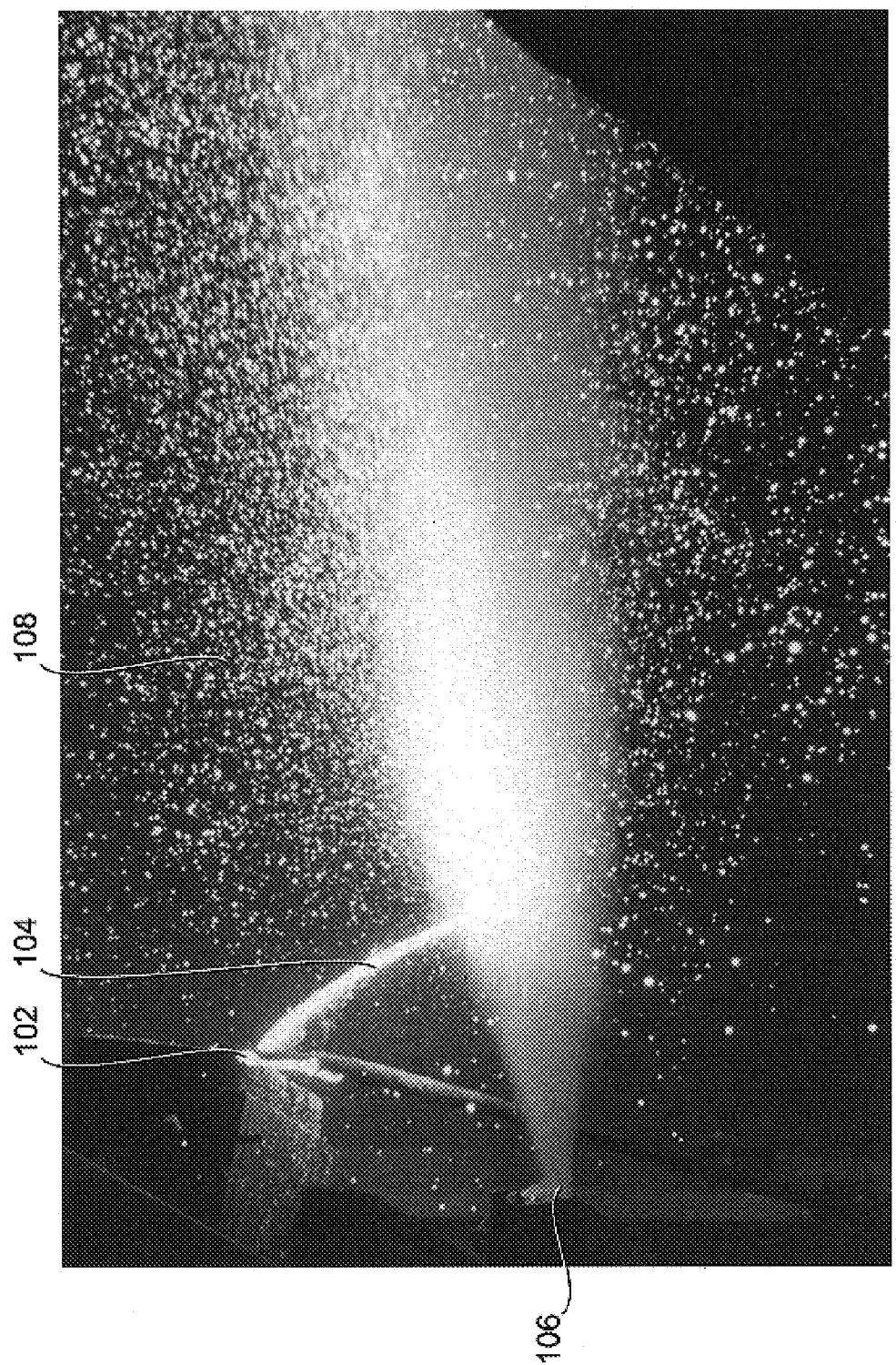
FIG. 1 is an image of an exemplary electrofusion process.

When melting is completed, a bessemerizing process is used to form substantially solid and substantially spherical particles of a desired diameter. The term "substantially solid" as used in this application is intended to distinguish the inventive materials from those that are considered in the industry to be hollow. It is not intended to imply that the materials lack all porosity. FIG. 1 is an illustration of the bessemerizing process in accordance with one embodiment of the present invention. Near the top of the Figure, the molten mixture is shown being poured from a pouring nozzle 102 to form a steady pour stream 104. Concurrently with the pouring, a pressure nozzle 106 located, for example, below the pouring nozzle 102, blasts a stream of compressed air directly into pour stream 104, causing the pour stream 104 to disperse into a plurality of spherical droplets 108 and rapidly solidify into spherical particles.

It will be understood by those skilled in the art that FIG. 1 is merely illustrative of the bessemerizing process in accordance with one embodiment of the present invention. Any other suitable variations of this process may be used.

The electrofused spheres created from the above bessemerizing process are collected, for example, using a suitable collection tray located below pour stream 104. The collected spheres are then sorted into desirable sizes by any method known to those skilled in the art such as, for example, by centrifugation or sieving according to the dimensions specified in the U.S. Standard Sieve Series commonly used within the art. A Mesh Table showing the commonly used U.S. Standard Sieve Series is shown in FIG. 2.

The sieving analysis involves a number of specific steps. In accordance with one embodiment of the present invention, sieves of desirable sizes are cleaned to ensure that they are free of loose proppants, resins, or dust. The sieves are then weighed individually and stacked on top of each other inside a base pan with the lowest sieve size (i.e., the one with the largest holes) at the top and the largest sieve size at the bottom.

The collected electrofused spheres are separated into batches of about 80 grams and weighed. Each batch is then poured into the top sieve of the stack. A lid is place upon this top sieve and firmly secured in place by an "o" ring. The stack of sieves is placed on a sieve shaker and shaken for about 10 minutes. After shaking, the sieves are individually weighed again along with the spheres that were held by the sieve. The previously recorded sieve weight is subtracted from the total sieve weight with the electrofused spheres to determine the weight of the electrofused spheres at a particular sieve size.

The total weight of the electrofused spheres in all sieves is calculated and compared to the initially recorded weight of the electrofused spheres prior to sieving to identify procedural errors. If the weight difference is within an allowable range, such as about 1%, then the process is considered to be valid and the weight of the electrofused spheres in each sieve is calculated as a percentage of the total weight of electrofused spheres from all the sieves. In this way, the sieving analysis provides an assessment of the percentages of electrofused spheres produced at various sizes in accordance with one embodiment of the present invention.

In some embodiments, the electrofused spheres for use as proppants are formed to an average diameter of about 0.1 mm to about 3 mm, which corresponds to a mesh size of about 6 to about 140 mesh. In some embodiments, it may be desirable to restrict the size ranges of the electrofused spheres from about 0.2 mm to about 2 mm, which corresponds to about 10 to about 80 mesh. It may be further desirable in some embodiments to further restrict the size of the electrofused spheres from about 0.2 mm to about 1.7 mm, which corresponds to about 12 to about 80 mesh. The choice of size may depend upon considerations such as the intended fracture depth, the choice of carrier fluid, or other factors known to those skilled in the art.

Depending on the application, the electrofused spheres may have varying apparent specific gravities. While "specific gravity" is known in the art to refer to the weight per unit volume of a material as compared to the weight per unit volume of water at a given temperature, "apparent specific gravity" as used in this application refers to the weight per unit volume of a material including only the material itself and its internal porosity as compared to the weight per unit volume of water. Thus, in the apparent specific gravity computation, first the weight of the material being measured is determined. Then the volume of the material, including only the volume of the material and its internal pores, is determined. For some materials, this step is easily accomplished by placing the material in water and measuring the volume of the displaced water. For proppants of this type, however, water may permeate and fill in the interior pores, giving inaccurate results. Consequently, it is necessary to measure the displacement in mercury or some similar fluid that will not permeate the material and fill its internal pores. The weight per unit volume measured in this manner is then compared to the weight per unit volume of water at a given temperature. The specific temperature used in accordance with this application is about 25 degrees Celsius.

Electrofused spheres of the sizes discussed above generally have an associated apparent specific gravity of less than about 3.9. In some embodiments, the apparent specific gravity of the electrofused spheres may be limited to between about 3.0 to about 3.9. It may be further desirable to restrict the apparent specific gravity of the electrofused spheres from about 3.4 to about 3.7 in some embodiments.

The above electrofused spheres also have an associated bulk density of between about 1.7 $g/cm^3$ to about 2.7 $g/cm^3$. In some embodiments, it may be desirable for the bulk density to be between about 1.9 $g/cm^3$ and about 2.5 $g/cm^3$. Bulk density as used in this application and understood within the art refers to the mass of a particular volume of electrofused spheres divided by the volume occupied by the electrofused spheres where the mass has been compacted. This is sometimes referred to as "packed" or "tapped" bulk density. The measurement method of the "packed" or "tapped" bulk density is that set forth by the Federation of European Producers of Abrasives (FEPA) as standard number 44-D. The volume used for the calculation of bulk density includes both the space between the electrofused spheres and the pore spaces (both interior and exterior) of the electrofused spheres.

It is known within the art that proppants having a high apparent specific gravity and high alumina content exhibit superior crush resistance. Crush resistance as used in this application is measured according to procedures promulgated by the API for measuring proppant crush. Specifically, a certain volume of the spherical particles of a given dimension range (e.g., 20/40 mesh) is loaded into a crush cell with a floating piston. For a desired stress level, the piston presses onto the proppant at the required stress level (e.g., 20,000 psi) for a set period of time (e.g., two minutes). The weight percentage of crushed materials, for example, gathered by sieving the fines through a sieve of a desired size (e.g., less than about 1 mm), is measured.

Results of tests using the API crush resistance procedures indicate the electrofused spheres exhibit high crush resistance up to 50,000 psi. Because crush resistance alone is generally insufficient to illustrate the potential conductivity that is essential to a proppant, a conductivity test according to API Recommended Practice 61 for measuring conductivity is also used. In a particular test, a quantity of electrofused spheres in accordance with one embodiment of the present invention was placed and leveled in a test cell between Ohio sandstone rocks. Ohio sandstone has a static elastic modulus of approximately 4 million psi and a permeability of 0.1mD. Heated steel plates provided the desired temperature simulation for the test. A thermocouple was inserted into the middle portion of the electrofused sphere collection to record the temperature. A servo-controlled loading ram provided a closing pressure on the proppant between the Ohio sandstone rocks. The test cell was initially set at 80° F. and 1,000 psi. The cell was then heated to 250° F. and held for 4 hours before the stress was increased to 2,000 psi over 10 minutes. After 50 hours at 2,000 psi, measurements were made, and then the stress level was raised to 3,000 psi. The same procedures were applied and subsequent measurements were made at 5,000 psi, 7,500 psi, and 10,000 psi over a total of 254 hours.

Measurements were taken of the pressure drop in the middle of the electrofused sphere pack to enable calculation of the permeability at a particular stress condition according to Darcy's Law. Specifically, permeability is part of the proportionality constant in Darcy's Law, which relates flow rate and fluid physical properties (e.g., viscosity) to the stress level applied to a pack of electrofused spheres. Permeability is a property specifically relating to a pack of electrofused spheres, not the fluid. Conductivity, on the other hand, describes the ease with which fluid moves through pore spaces in a pack of electrofused spheres. Conductivity depends on the intrinsic permeability of an electrofused sphere pack as well as the degree of saturation. In particular, conductivity expresses the amount of fluid that will flow through a cross-sectional area of an electrofused sphere pack under the desired stress level.

Specifically, to measure conductivity, a 70 mbar full range differential pressure transducer was started. When the differential pressure appeared to be stable, a tared volumetric cylinder was placed at the outlet and a stopwatch was started. The output from the differential pressure transducer was fed to a data collector, which recorded the output every second. Fluid was collected for 5 to 10 minutes after which the flow rate was determined by weighing the collected effluent. The mean value of the differential pressure was retrieved from a multi-meter, as were the peak high and low values. If the difference between the high and low values was greater than 5% of the mean, the data was disregarded. Temperature was recorded at the start and end of the flow test period. Viscosity of the fluid was obtained using the measured temperature and viscosity tables. At least three permeability determinations were made at each stage using Darcy's Law. The standard deviation of the determined permeabilities had to be less than 1% of the mean value before the test was accepted.

Using the conductivity testing method above, a pack of 20/40 mesh electrofused spheres in accordance with one embodiment of the present invention exhibited conductivity of at least about 3,400 md-ft and a permeability of at least about 230 Darcies at a closing pressure of about 5,000 psi. Other embodiments may exhibit conductivities of at least about 4,000 md-ft at 5,000 psi, and permeabilities of at least about 200 Darcies at 5,000 psi.

The surprisingly superior conductivity and permeability of the electrofused spheres at that closing pressure may be attributed to the spheres' relatively smooth surface, their superior crush resistance as a result of their high alumina content, and their highly spherical shape that provides an increased void volume over the more irregular spherical proppants of the prior art.

The highly spherical shape and substantially smooth surface are particularly advantageous when compared to the sintered spheres that are currently being used in the industry. More specifically, the spheres made from the commonly used sintering method acquire their form from, for example, a dry pelletizing process commonly used in the proppant manufacturing industry (as described in detail in U.S. Pat. No. 4,427,068 to Fitzgibbon). During this dry pelletizing process, a mixing device such as an Eirich Mixer having a horizontal or inclined circular table and capable of rotating at a speed of from about 10 to about 60 revolutions per minute is used to mix a ground dry power of the desired base material for forming the pellets. A rotatable impact impeller is provided inside the circular table, which rotates in an opposite direction to the rotational direction of the circular table and causes the material added to the mixer to flow over itself in a countercurrent manner. While the circular table and the impact impeller are both rotating, the dry powder for forming the pellets is continually added until the desired size of unsintered pellets is formed. The pellets are then sintered to cause crystallization and hardening of the base material.

Because the above dry pelletizing process forms the spheres through the use of a countercurrent, which forces the spheres to rub against each other, the resulting spheres are typically not highly spherical in shape and contain many imperfections such as dents and protrusions.

Figure 3A:
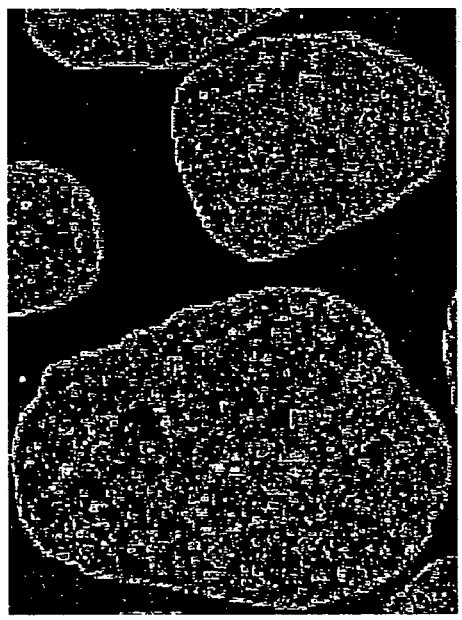
FIG. 3a is an image of a sintered spherical proppant.

Another known method for pelletizing spheres for sintering is a wet method. This method involves preparing an aqueous feed from the desired pellet materials and continuously atomizing the feed into a layer of already partly dried particles made from the same pellet material that is fluidized in a stream of drying air. The formed pellets are continuously retrieved from the layer and separated into desired sizes before sintering. This wet method also produces particles that are of less than ideal sphericity due to uneven contact with dry ingredients and variations in the air stream. Sintered spherical proppants prepared according to the above processes generally have a sphericity of slightly better than 0.7 on the Krumbein scale. An exemplary image of such sintered spheres currently being used in the industry is shown in FIG. 3a. The irregular shapes and rough surfaces of these sintered spheres are apparent.

While such a sintered sphere may satisfy the basic requirements of a proppant, it has a number of draw backs in proppant applications. For example, the less than ideal spherical shape does not facilitate an even distribution of load pressure and creates stress points throughout the proppant pack under high closing pressure. This uneven distribution of stress leads to crushing and the generation of fines. Sintered spheres under pressure break into very minute, dust-like pieces that have a tendency to create densely packed fine layers that significantly reduce both permeability and conductivity. Additionally, the fines tend to have sharp edges, which when in contact with surrounding intact spheres, concentrate the compression forces onto other spheres at the sharp contact points and contribute to the destruction of the surrounding spheres in the proppant pack.

The process of electrofusing spheres, however, results in spheres that have been homogeneously cooled from the outside to the inside. Consequently, a radial organization of crystals form toward the center of the sphere, thereby creating a potential radial cleavage plane. Thus, in contrast to sintered spherical proppants, electrofused spheres may fail under high compressive forces to result in fines shaped like half-spheres, or slices of spheres. These fines have fewer sharp edges and are less aggressive in their destructive effect on the other spheres in the pack than the fines created when a sintered sphere fails.

The irregularities on a sintered sphere's exterior also make the sphere more resistant to fluid flow. The disadvantage here is three-fold. First, irregular materials have a higher coefficient of friction, making it more difficult to remove the fracturing fluid from between them during clean up. Any fracturing fluid that remains in the proppant pack after injection will close up voids that oil or natural gas could otherwise flow through to the well. Consequently, the conductivity of the pack may be reduced if clean up cannot be effectively and efficiently conducted. Also, the clean up phase of a fracturing operation can take days, and prohibits use of the well to pump oil or natural gas. The cost in terms of clean up man-hours, clean up equipment, and the delayed pumping of oil or natural gas is extremely high and is well-known to those in the art. Second, the irregularities reduce the conductivity of the proppant pack, as it would have a higher compacity and lower void volume compared to proppants that are more uniformly spherical. Third, an irregular texture on a sintered sphere surface makes the sphere highly abrasive when injected under pressure and in large quantities. This will likely to contribute to equipment wear-and-tear during fracturing and within the well.

In view of the above disadvantages associated with a lack of sphericity and smoothness, improved sphericity is therefore advantageous because it increases both the strength and the conductivity of the proppant. In accordance with one embodiment of the present invention, the electrofused sphere is able to achieve a sphericity of at least about 0.8 on the Krumbein scale. In some embodiments, the electrofused spheres possess a sphericity of at least about 0.9 on the Krumbein scale. It is even possible to make electrofused spheres with a sphericity of more than about 0.95 on the Krumbein scale. This improved sphericity is a direct consequence of the electrofusion process, described above.

Figure 3B:
FIG. 3b is an image of an electrofused proppant consistent with the present invention.

An image of exemplary electrofused spheres in accordance with one embodiment of the present invention is shown in FIG. 3b. The electrofused spheres in this Figure are much closer to ideal spheres than the sintered spheres of FIG. 3a. Consequently, the electrofused spheres have a more uniform fit within a proppant pack and distribute load pressure more evenly between individual spheres. This results in less crushing and fewer undesirable fines, along with a larger void volume on average. Moreover, the electrofusion process starts from a molten liquid as opposed to a mixture of powders that is typically used in preparing sintered spherical proppants. This distinction means that the electrofused proppants can have a smoother exterior, as the smoothness of the prior art proppants is limited by the size of the original powder used to create them.

The highly spherical shape and smooth exterior of the electrofused proppant overcome the disadvantages of the prior art. For example, a smooth proppant has a lower coefficient of friction than one having an irregular surface. Accordingly, the fracturing fluid can more easily be removed from the pack, leading to increased conductivity and a lower cost of clean up. A smooth, spherical proppant will also result in increased void spaces in the pack, also aiding conductivity. Yet another advantage is that a smooth spherical proppant will not be nearly as abrasive to well equipment or to the equipment used in the fracturing operation. All of these advantages lead to an increased return on investment through lower clean up costs, higher well up-time, and increased conductivity.

The specific surface areas of the electrofused spheres are obtained according to the widely-used BET method (Brunauer, Emmett and Teller) that calculates specific surface area based on adsorption of gaseous molecules, such as nitrogen, on the sphere surface. The electrofused spheres in accordance with one embodiment of the present invention generally acquire a substantially smooth surface measuring between about 0.05 $m^2/g$ and about 0.5 $m^2/g$.

Because sphere formation during electrofusion is almost instantaneous, often a wide particle size distribution results from this manufacturing process instead of making a substantial amount of pellets with the desired diameter range. A number of adjustments to the standard electrofusion process may be made to ensure more electrofused spheres will be manufactured within a desired dimension range. For example, EP 1,157,077 suggests using ultrasound waves to aid in the dispersion and cooling of the pellets. This method is somewhat complicated, requires specialized equipment, and may not be suitable for mass production.

Another way to encourage the production of smaller electrofused spheres involves the use of additives, such as water, in the compressed air used during the bessemerizing process. When water comes into contact with the molten mixture, it extracts a portion of the heat away from the mixture and creates a more rapid cooling effect. This rapid cooling effect leads to quicker solidification, which results in the production of a greater amount of smaller diameter spheres. In an embodiment of the present invention, the electrofused spheres produced using this modified bessemerizing process range between about 0.1 mm and about 5 mm in diameter. Other materials known in the art to absorb large amounts of energy may be used as well to rapidly decrease the temperature and speed solidification to the desired extent to provide a greater percentage of the desired sized sphere, so long as the material does not adversely impact the final product properties.

Yet another modification for the production of smaller electrofused spheres involves reducing the flow of the pour stream. With a reduced pour stream, the compressed air may be more effective in causing rapid solidification of individual droplets, thereby resulting in a higher proportion of smaller diameter electrofused spheres. With the reduction of flow, it may be necessary to monitor the viscosity of the flow to ensure that the slower pour does not result in solidification in the pour spout or the casting channel leading up to the pour spout. In some embodiments of the present invention, adoption of one or more of the above modifications may result in as much as up to 100% of the electrofused spheres measuring below about 2 mm in diameter.

It will be understood that the above modifications are merely examples of methods that may be implemented in connection with the electrofusion process to cause rapid solidification of the spheres, thereby generating smaller spheres. These methods may be altered to suit various conditions during the electrofusion process and/or used in combination with each other or other processes without departing from the spirit of the present invention.

Three specific examples for manufacturing electrofused spheres from various suitable raw materials in accordance with embodiments of the present invention are discussed below. It will be understood that these examples are merely illustrative. Various modifications to the process and substitution of raw materials may be made without departing from the spirit of the present invention.

EXAMPLE 1

Pure Alumina

A mixture of 1,000 kg of pure alumina and 4 kg of silica sand was melted in a lidded electrical arc furnace. The electrical arc furnace had a diameter of about 1.8 meters, a power of about 1.2 megawatts, and a voltage of about 172 volts. As soon as the mixture completely liquefied, the arc furnace was tilted and the molten mixture was poured from a pour spout to form a pour stream. Concurrently with the pouring, the pour stream was bessemerized with compressed air through a tube having an air nozzle directed at the pour stream. An air pressure of 8 bars was used, but other suitable pressures can be determined by those skilled in the art. The pressurized air caused individual droplets of the molten mixture to separate and rapidly solidify into spheres. The electrofused spheres were then collected in the bessemerizing chamber with a base comprising water-cooled steel plates. The electrofused spheres were then transported into a cooling tube by an air stream. After sufficient cooling, the electrofused spheres were screened into suitable sizes by sieving as described above.

EXAMPLE 2

Bauxite 1,000 kg of bauxite having an alumina content of about 85% was melted in a lidded electrical arc furnace in the manner described above in connection with Example 1. Bauxite with higher alumina percentages may also be used. Because natural bauxite generally contains a sufficient amount of silica, the addition of silica sand was not necessary in this instance. The molten bauxite was then processed in the same manner as described above for the pure alumina mixture.

EXAMPLE 3

Mullite Containing Baddeleyite 1,000 kg of mullite containing about 5% baddeleyite ($ZrO_2$) was melted in a lidded electrical arc furnace. The electrofusion process of the molten mixture was the same as described above for the pure alumina mixture.

Table 1 below shows the physical properties of electrofused spheres that were obtained using the raw materials described above in the examples. It will be understood that these properties are merely illustrative and may vary depending on modifications to the electrofusion process and raw materials.

TABLE 1

| | Example 1 (aluminum oxide) | Example 2 (bauxite) | Example 3 (mullite) |
|---|---|---|---|
| Apparent specific gravity (Hg) | 3.22 | 3.36 | 3.44 |
| Bulk density (g/cm$^3$) | 2.1 | 2.1 | 2.1 |
| Specific surface area (BET) (cm$^2$/g) | 0.25 | 0.23 | 0.23 |
| Roundness (according to Krumbein) | 0.95 | 0.97 | 0.97 |
| Spherical form (according to Krumbein) | 0.98 | 0.98 | 0.98 |
| Grain crushing resistance (according to Vollstaedt on sieve 35)(N) | 35 | 62 | 55 |
| Porosity (digital image analysis) (%) | 30 | 24 | 26 |

The Vollstaedt grain crushing resistance was measured using the known method involving the computerized testing of individual grain fracture strength, with size and shape analysis of the individual grains. The particular FEPA grit on the Vollstaedt sieve was 35. The pore volume percentage was measured using a combination of optical microscopy and software-controlled digital image analysis. Using various microscopy contrast methods (e.g., bright field), it was possible to distinguish different phases (minerals or pores) by the different gray scales appearing in the image. The software was then able to compute the porosity of the sample.

In view of the above, electrofused spheres prepared in accordance with an embodiment of the present invention are well-suited as proppants. The electrofused spheres contain a high percentage of alumina, which is known to improve strength and crush resistance in proppants. The electrofusion of the specific compositions of materials introduces finer pores within the sphere, which allows a better distribution of load within the sphere when under pressure, thereby reducing crushing and the production of undesirable fines. The electrofusion of the specific compositions also creates spheres that are very close to an ideal spherical shape with a smooth surface. Such spheres may have a reduced resistance and may allow for the creation of a more uniform proppant pack, which in turn improves the crush resistance and conductivity of the proppant pack.

We claim:

1. A high strength proppant comprising an electrofused pellet, wherein the proppant has an apparent specific gravity less than about 3.9, and wherein the proppant has a bulk density of between about 1.7 g/cm$^3$ and about 2.7g/cm$^3$.

2. The proppant of claim 1, wherein the electrofused pellet is substantially solid.

3. The proppant of claim 1, wherein the electrofused pellet has a substantially spherical shape.

4. The proppant of claim 3, wherein the electrofused pellet has a sphericity of at least 0.8 on the Krumbein scale.

5. The proppant of claim 4, wherein the electrofused pellet has a sphericity of greater than about 0.9 on the Krumbein scale.

6. The proppant of claim 5, wherein the electrofused pellet has a sphericity of greater than about 0.95 on the Krumbein scale.

7. The proppant of claim 1, wherein the electrofused pellet comprises a metal oxide.

8. The proppant of claim 7, wherein the metal oxide comprises alumina.

9. The proppant of claim 7, wherein the metal oxide is contributed by at least one of pure alumina, bauxite, or zircon mullite.

10. The proppant of claim 7, wherein the metal oxide is contributed by at least about 50% pure alumina by weight.

11. The proppant of claim 7, wherein the metal oxide is contributed by at least about 90% bauxite by weight.

12. The proppant of claim 1, wherein the electrofused pellet has an average diameter of about 0.1 mm to about 3 mm.

13. The proppant of claim 12, wherein the electrofused pellet has an average diameter of about 0.2 mm to about 2 mm.

14. The proppant of claim 13, wherein the electrofused pellet has an average diameter of about 0.25 mm to about 1.7 mm.

15. The proppant of claim 1, wherein the electrofused pellet has an average mesh size of about 6 mesh to about 140 mesh.

16. The proppant of claim 15, wherein the electrofused pellet has an average mesh size of about 10 mesh to about 80 mesh.

17. The proppant of claim 16, wherein the electrofused pellet has an average mesh size of about 12 mesh to about 80 mesh.

18. The proppant of claim 1 wherein the proppant has a compressive strength of up to about 50,000 psi.

19. The proppant of claim 1 wherein the proppant has a conductivity of at least about 4,000 md-ft at a closing pressure of about 5,000 psi.

20. The proppant of claim 1 wherein the proppant has a permeability of at least about 200 Darcies at a closing pressure of about 5,000 psi.

21. The proppant of claim 1 wherein the proppant has an apparent specific gravity of between about 3.0 and about 3.9.

22. The proppant of claim 21 wherein the proppant has an apparent specific gravity of between about 3.4 and about 3.7 g/cm$^3$.

23. The proppant of claim 1 wherein the proppant has a bulk density of between about 1.9 g/cm$^3$ and about 2.5 g/cm$^3$.

24. The proppant of claim 1 wherein the proppant has a BET specific surface area of between about 0.05 m$^2$/g and about 0.5 m$^2$/g.

25. The proppant of claim 1 wherein the proppant has a Vollstaedt grain crush resistance of greater than or equal to about 30 N.

26. The proppant of claim 25 wherein the proppant has a Vollstaedt grain crush resistance of greater than or equal to about 60 N.

27. The proppant of claim 1 wherein the proppant has a pore volume of less than about 50%, wherein the pore volume is determined by digital image analysis.

28. The proppant of claim 27 wherein the proppant has a pore volume of less than about 30%.

29. The proppant of claim 28 wherein the proppant has a pore volume of less than about 20%.

30. The proppant of claim 1 wherein the proppant has a substantially smooth surface.

31. A high strength proppant comprising a substantially solid and substantially spherical pellet produced by electrofusion of at least one metal oxide wherein the proppant has an apparent specific gravity less than about 3.9, and the proppant has a bulk density of between about 1.7 g/cm$^3$ and about 2.7 g/cm$^3$.

32. The proppant of claim 31, wherein the pellet has a sphericity of at least 0.8 on the Krumbein scale.

33. The proppant of claim 32, wherein the pellet has a sphericity of greater than about 0.9 on the Krumbein scale.

34. The proppant of claim 33, wherein the pellet has a sphericity of greater than about 0.95 on the Krumbein scale.

35. The proppant of claim 31, wherein the metal oxide comprises alumina.

36. The proppant of claim 35, wherein the metal oxide is contributed by at least one of pure alumina, bauxite, or zircon mullite.

37. The proppant of claim 35, wherein the metal oxide is contributed by at least about 50% pure alumina by weight.

38. The proppant of claim 35, wherein the metal oxide is contributed by at least about 90% bauxite by weight.

39. The proppant of claim 31, wherein the pellet has an average diameter of about 0.1 mm to about 3 mm.

40. The proppant of claim 39, wherein the pellet has an average diameter of about 0.2 mm to about 2 mm.

41. The proppant of claim 40, wherein the pellet has an average diameter of about 0.25 mm to about 1.7 mm.

42. The proppant of claim 31, wherein the pellet has an average mesh size of about 6 mesh to about 140 mesh.

43. The proppant of claim 42, wherein the pellet has an average mesh size of about 10 mesh to about 80 mesh.

44. The proppant of claim 43, wherein the pellet has an average mesh size of about 12 mesh to about 80 mesh.

45. The proppant of claim 31 wherein the pellet has a compressive strength of up to about 50,000 psi.

46. The proppant of claim 31 wherein the proppant has a conductivity of at least about 4,000 md-ft at a closing pressure of about 5,000 psi.

47. The proppant of claim 31 wherein the proppant has a permeability of at least about 200 Darcies at a closing pressure of about 5,000 psi.

48. The proppant of claim 31 wherein the proppant has an apparent specific gravity of between about 3.0 and about 3.9.

49. The proppant of claim 48 wherein the proppant has an apparent specific gravity of between about 3.4 and about 3.7.

50. The proppant of claim 31 wherein the proppant has a bulk density of between about 1.9 g/cm$^3$ and about 2.5 g/cm$^3$.

51. The proppant of claim 31 wherein the proppant has a BET specific surface area of between about 0.05 m$^2$/g and about 0.5 m$^2$/g.

52. The proppant of claim 31 wherein the proppant has a Vollstaedt grain crush resistance of greater than or equal to about 30 N.

53. The proppant of claim 52 wherein the proppant has a Vollstaedt grain crush resistance of greater than or equal to about 60 N.

54. The proppant of claim 31 wherein the proppant has a pore volume of less than about 50%, wherein the pore volume is determined by a digital image analysis.

55. The proppant of claim 54 wherein the proppant has a pore volume of less than about 30%.

56. The proppant of claim 55 wherein the proppant has a pore volume of less than about 29%.

57. The proppant of claim 31, wherein the proppant has a substantially smooth surface.

58. The proppant of claim 57, wherein the substantially smooth surface improves fluid conductivity and reduces abrasiveness.

59. A method of making a proppant, comprising:
melting at least one metal oxide in an electrical arc furnace;
pouring the molten metal oxide to create a pour stream; and
separating the pour stream to form at least one electrofused pellet, wherein the proppant has an apparent specific gravity less than about 3.9, and
wherein the electrofused pellet has a bulk density of between about 1.7 g/cm$^3$ and about 2.7 g/cm$^3$.

60. The method of claim 59, wherein separating the pour stream comprises bessemerizing the pour stream with compressed air to form the at least one electrofused pellet.

61. The method of claim 60, wherein the compressed air has an air pressure of between about 3 bars to about 10 bars.

62. The method of claim 59, wherein separating the pour stream comprises separating the pour stream to form the at least one electrofused pellet using centrifugal forces.

63. The method of claim 59, further comprising melting the at least one metal oxide in the electrical arc furnace under oxidizing conditions.

64. The method of claim 59, further comprising including about 0.1% to about 1% SiO$_2$ by weight in the molten metal oxide mixture.

65. The method of claim 64, wherein the molten metal oxide mixture includes about 0.3% to about 0.6% SiO$_2$ by weight.

66. The method of claim 59, wherein the molten metal oxide mixture is poured at a rate of less than about 100 kilograms per minute to create the pour stream.

67. The method of claim 59, wherein the electric arc furnace has a power of about 1.2 MW.

68. The method of claim 59, wherein the electric arc furnace is operated with a voltage of about 172 volts.

69. The method of claim 59, wherein the electrofused pellet is substantially solid.

70. The method of claim 59, wherein the electrofused pellet has a spherical shape.

71. The method of claim 70, wherein the electrofused pellet has a sphericity of at least 0.8 on the Krumbein scale.

72. The method of claim 71, wherein the electrofused pellet has a sphericity of greater than about 0.9 on the Krumbein scale.

73. The method of claim 72, wherein the electrofused pellet has a sphericity of greater than about 0.95 on the Krumbein scale.

74. The method of claim 59, wherein the at least one metal oxide comprises alumina.

75. The method of claim 74, wherein the at least one metal oxide is contributed by at least one of pure alumina, bauxite, or mullite.

76. The method of claim 59, wherein the at least one metal is contributed by at least about 50% alumina by weight.

77. The method of claim 59, wherein the at least one metal oxide is contributed by at least about 90% bauxite by weight.

78. The method of claim 59, wherein the electrofused pellet has an average diameter of about 0.1 mm to about 3 mm.

79. The method of claim 78, wherein the electrofused pellet has an average diameter of about 0.2 mm to about 2 mm.

80. The method of claim 79, wherein the electrofused pellet has an average diameter of about 0.25 mm to about 1.7 mm.

81. The method of claim 59, wherein the electrofused pellet has an average mesh size of about 6 mesh to about 140 mesh.

82. The method of claim 81, wherein the electrofused pellet has an average mesh size of about 10 mesh to about 80 mesh.

83. The method of claim 82, wherein the electrofused pellet has an average mesh size of about 12 mesh to about 80 mesh.

84. The method of claim 59, wherein the electrofused pellet has a compressive strength of up to about 50,000 psi.

85. The method of claim 59, wherein the proppant has a conductivity of at least about 4,000 md-ft at a closing pressure of about 5,000 psi.

86. The method of claim 59, wherein the proppant has a permeability of at least about 200 Darcies at a closing pressure of about 5,000 psi.

87. The method of claim 59, wherein the electrofused pellet has an apparent specific gravity of between about 3.0 and about 3.9.

88. The method of claim 87, wherein the electrofused pellet has an apparent specific gravity of between about 3.4 and about 3.7.

89. The method of claim 59, wherein the electrofused pellet has a bulk density of between about 1.9 g/cm$^3$ and about 2.5 g/cm$^3$.

90. The method of claim 59, wherein the electrofused pellet has a BET specific surface area of between about 0.05 m$^2$/g and about 0.5 m$^2$/g.

91. The method of claim 59, wherein the electrofused pellet has a Vollstaedt grain crush resistance of greater than or equal to about 30 N.

92. The method of claim 91, wherein the electrofused pellet has a Vollstaedt grain crush resistance of greater than or equal to about 60 N.

93. The method of claim 59, wherein the electrofused pellet has a pore volume of less than about 50%, wherein the pore volume is determined by a digital image analysis.

94. The method of claim 93, wherein the electrofused pellet has a pore volume of less than about 30%.

95. The method of claim 59, wherein the electrofused pellet has a substantially smooth surface.

96. A method of fracturing subterranean formations comprising injecting a fluid containing at least one electrofused pellet wherein the electrofused pellet has an apparent specific gravity less than about 3.9, and wherein the electrofused pellet has a bulk density of between about 1.7 g/cm$^3$ and about 2.7 g/cm$^3$.

97. The method of claim 96, wherein the electrofused pellet is substantially solid.

98. The method of claim 96, wherein the electrofused pellet has a substantially spherical shape.

99. The method of claim 98, wherein the electrofused pellet has a sphericity of at least 0.8 on the Krumbein scale.

100. The method of claim 99, wherein the electrofused pellet has a sphericity of greater than about 0.9 on the Krumbein scale.

101. The method of claim 100, wherein the electrofused pellet has a sphericity of greater than about 0.95 on the Krumbein scale.

102. The method of claim 96, wherein the electrofused pellet comprises a metal oxide.

103. The method of claim 102, wherein the metal oxide comprises alumina.

104. The method of claim 102, wherein the metal oxide is contributed by at least one of pure alumina, bauxite, or zircon mullite.

105. The method of claim 102, wherein the metal oxide is contributed by at least about 50% pure alumina by weight.

106. The method of claim 102, wherein the metal oxide is contributed by at least about 90% bauxite by weight.

107. The method of claim 96, wherein the electrofused pellet has an average diameter of about 0.1 mm to about 3 mm.

108. The method of claim 107, wherein the electrofused pellet has an average diameter of about 0.2 mm to about 2 mm.

109. The method of claim 108, wherein the electrofused pellet has an average diameter of about 0.25 mm to about 1.7 mm.

110. The method of claim 96, wherein the electrofused pellet has an average mesh size of about 6 mesh to about 140 mesh.

111. The method of claim 110, wherein the electrofused pellet has an average mesh size of about 10 mesh to about 80 mesh.

112. The method of claim 111, wherein the electrofused pellet has an average mesh size of about 12 mesh to about 80 mesh.

113. The method of claim 96 wherein the electrofused pellet has a compressive strength of up to about 50,000 psi.

114. The method of claim 96 wherein the electrofused pellet has a conductivity of at least about 4,000 md-ft at a closing pressure of about 5,000 psi.

115. The method of claim 96 wherein the electrofused pellet has a permeability of at least about 200 Darcies at a closing pressure of about 5,000 psi.

116. The method of claim 96 wherein the electrofused pellet has an apparent specific gravity of between about 3.0 and about 3.9.

117. The method of claim 116 wherein the electrofused pellet has an apparent specific gravity of between about 3.4 and about 3.7 $g/cm^3$.

118. The method of claim 96 wherein the electrofused pellet has a bulk density of between about 1.9 $g/cm^3$ and about 2.5 $g/cm^3$.

119. The method of claim 96 wherein the electrofused pellet has a BET specific surface area of between about 0.05 $m^2/g$ and about 0.5 $m^2/g$.

120. The method of claim 96 wherein the electrofused pellet has a Vollstaedt grain crush resistance of greater than or equal to about 30 N.

121. The method of claim 120 wherein the electrofused pellet has a vollstaedt grain crush resistance of greater than or equal to about 60 N.

122. The method of claim 96 wherein the electrofused pellet has a pore volume of less than about 50%, wherein the pore volume is determined by digital image analysis.

123. The method of claim 122 wherein the electrofused pellet has a pore volume of less than about 30%.

124. The method of claim 123 wherein the electrofused pellet has a pore volume of less than about 20%.

125. The method of claim 96 wherein the electrofused pellet has a substantially smooth surface.

* * * * *

UNITED STATES PATENT AND TRADEMARK OFFICE
CERTIFICATE OF CORRECTION

PATENT NO. : 7,654,323 B2
APPLICATION NO. : 11/465602
DATED : February 2, 2010
INVENTOR(S) : Alary et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 581 days.

Signed and Sealed this

Twenty-third Day of November, 2010

David J. Kappos
*Director of the United States Patent and Trademark Office*